United States Patent [19]

Theis et al.

[11] 4,150,255

[45] Apr. 17, 1979

[54] CONVERSATIONAL TELEPHONE CALL DISTRIBUTOR

[75] Inventors: Peter F. Theis, McHenry; Gregory Buchberger, Mt. Prospect, both of Ill.

[73] Assignee: Morgan Industries, Inc., Chicago, Ill.

[21] Appl. No.: 865,396

[22] Filed: Dec. 29, 1977

[51] Int. Cl.² ............................................. H04M 1/64
[52] U.S. Cl. ................................................... 179/6 C
[58] Field of Search ............ 179/6 C, 6 R, 2 A, 1 HF, 179/100.1 VC, 18 B, 18 BE, 27 FH

[56] References Cited

U.S. PATENT DOCUMENTS

| 3,728,486 | 4/1973 | Kraus | 179/6 C |
| 3,784,721 | 1/1974 | Kilby | 179/6 R |
| 3,943,290 | 3/1976 | Golden | 179/6 C |
| 4,071,698 | 1/1978 | Barger, Jr. et al. | 179/2 A |
| 4,079,200 | 3/1978 | Meri | 179/6 R |

Primary Examiner—Vincent P. Canney
Assistant Examiner—Donald McElheny, Jr.
Attorney, Agent, or Firm—Hume, Clement, Brinks, Willian and Olds, Ltd.

[57] ABSTRACT

A call distributor for use with a plurality of telephone lines is described which includes an automatic telephone answering machine which interrogates the calling party with a prerecorded message and transmits the calling party's response to this message to a recorder. The recorded response is then replayed to an operator who intercepts the call in order to converse with the calling party after auditing the recorded response. The call distributor of this invention thereby combines the flexibility of an operator assisted call distributor with the efficiency of automatic interrogation of the calling party.

9 Claims, 2 Drawing Figures

CONVERSATIONAL TELEPHONE CALL DISTRIBUTOR

BACKGROUND OF THE INVENTION

This invention relates to a telephone call distributor and more particularly to an improved call distributor and holding system which is adapted to permit one or more operators to efficiently service a large number of callers.

Telephone call distributors and queueing systems are routinely used to enable operating personnel to better service a large number of callers. Such systems generally include means for answering a ringing call and delivering a prerecorded message to the caller. In that these systems can be used to answer and establish preliminary contact with a large number of callers, they increase the number of callers who can be served at any one time, and thereby reduce the number who call only to find lines being unanswered.

One type of commonly used call distributor is designed to answer a ringing call, deliver a prerecorded message which requests the caller to wait until an operator is available, and then places the caller in a queue on hold. When an operator becomes available the call is intercepted and the caller put in live contact with an operator. Such call distributors do not interrogate the caller, and the operator must question the caller in live conversation in order to extract all information necessary to service the call. For instance, a caller who is seeking to place a sales order and obtain pricing information must be questioned by the operator as to the order and the pricing information request. The call distributor does not reduce the amount of time that is required for the operator to service a call. Instead, it merely holds waiting callers until an operator is available. Caller waiting periods may become excessively long during peak load periods, with resulting caller frustration and alienation.

A second type of call distributor in widespread use differs from the first in that it interrogates the caller in order to reduce the amount of operator time required to service a call and thereby reduce peak loads on operators. These distributors answer ringing calls, deliver a prerecorded message to the caller, and then record the caller's response to this message. The simplest systems merely ask the caller to leave a message; more complex systems engage in a simulated conversation with a caller. A series of prerecorded messages is delivered and the caller's response to each question recorded in turn. Such distributors may be programmed to service a limited range of caller requests. For instance, a distributor of this type may be programmed to request and record the information involved in placing a sales order. After the caller responses are recorded the distributor disconnects the line in order to free it for another incoming call, and the recorded responses are reviewed at a later time by an operator.

Distributors of this second type may be effective in reducing caller waiting time, but such systems lack the flexibility of a live operator. In the above example, the distributor might adequately service a call if the caller intended to place a sales order. However, if the caller desired to place a sales order and obtain pricing information, or merely to obtain pricing information, the caller's needs would not be met by the distributor.

SUMMARY OF THE INVENTION

The call distributor of this invention includes means such as a telephone answering machine for automatically answering a ringing call, delivering a prerecorded message to the caller, and recording the caller's response to this message. After the caller's response has been recorded, the caller is placed on hold in a queue until an operator is available to service the call. Once an operator is available, the recorded caller response is replayed to the operator, and then the waiting call is intercepted by the operator. The operator converses with the caller and insures that the call is properly serviced.

One important advantage of the call distributor of this invention is that the operator is not required to extract all necessary information from the caller in live conversation. Instead, a part of this information is obtained and recorded before the operator intercepts the call. In this way the time required for an operator to service a call is reduced in many cases, and operator capacity is thereby increased.

Operator efficiency is further increased in that the operator hears the recorded caller responses before intercepting the call. It has been found that in many cases an operator can audit recorder caller responses in less than one half the time required to extract the same information in live conversation. By hearing caller responses before intercepting the call the operator is quickly introduced to the requirements of the individual caller.

By combining means for recording caller responses with operator intervention a flexible call distributor is achieved which provides both improved utilization of operating personnel and improved servicing of caller needs. Further objects and attendant advantages of the invention will become apparent from the following description taken in connection with the appended drawings.

DETAILED DESCRIPTION OF A PREFERRED EMBODIMENT

Figure 1:
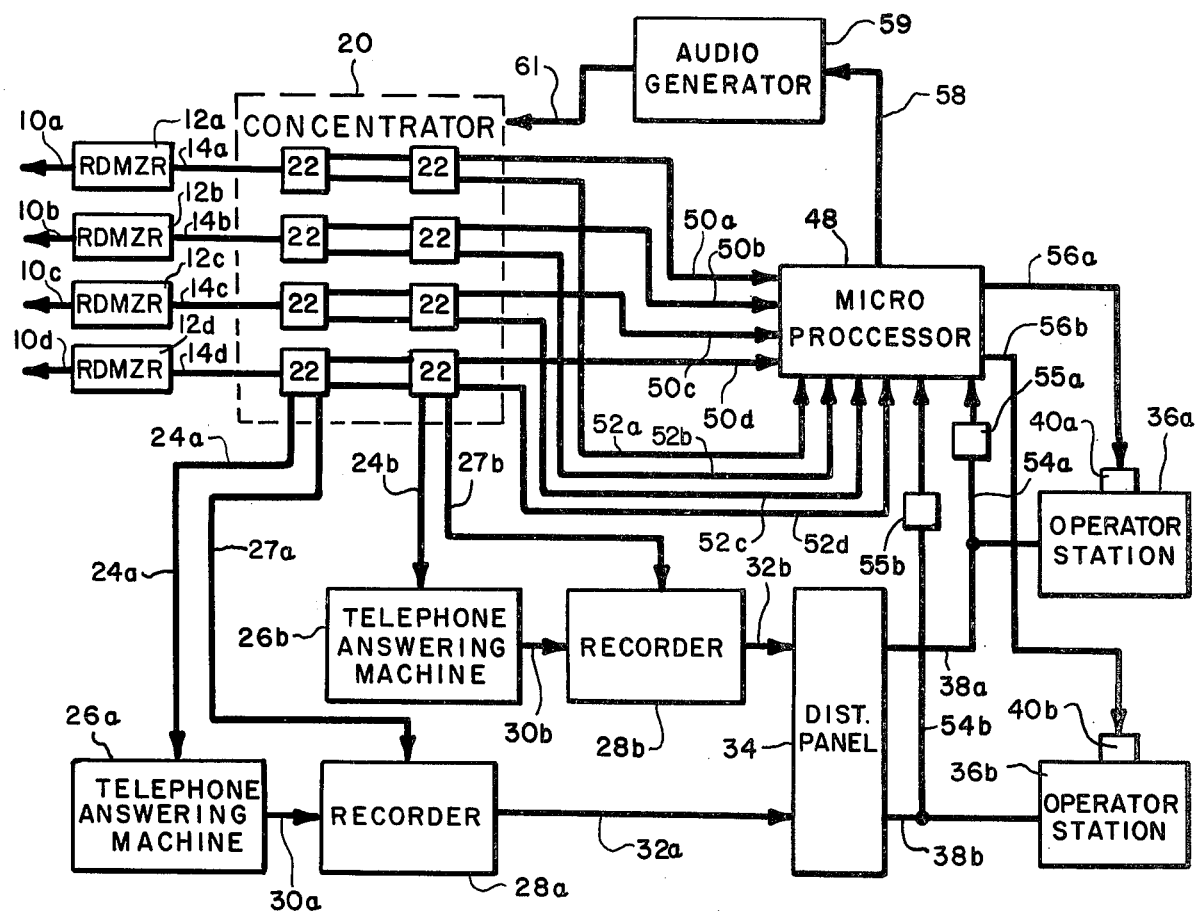
FIG. 1 is a block diagram of one embodiment of the call distributor of this invention.

One embodiment of the call distributor of this invention is depicted in FIG. 1. This embodiment is adapted to service calls coming in on four telephone lines, 10a-d, and is suited for use with a conventional interface unit such as an RDM-ZR voice connecting arrangement commonly available from telephone utilities. It should be understood that the call distributor of this invention can be modified to interface with telephone lines in other ways.

In this embodiment, one RDM-ZR interface unit 12a-d, is connected to each telephone line 10a-d. These interface units 12a-d are also connected to a concentrator 20 by circuits 14a-d, respectively. The concentrator 20 functions to interconnect incoming calls on the telephone lines 10a-d with one of the two telephone answering machines 26a-b via one of the two interconnecting circuits 24a-b. The concentrator 20 is arranged as a matrix having a row associated with each of the telephone lines 10a-d and a column associated with each of the telephone answering machines 26a-b. A matrix intersection circuit 22 is provided at each element of the matrix which effects the interconnection. The operation of the intersection circuit 22 will be explained in greater detail in connection with FIG. 2.

The telephone answering machines 26a–b are connected to message recorders 28a–b by circuits 30a–b, respectively. Several types of commercially available telephone answering machines may be used in this application ranging from simple machines that deliver a single prerecorded message to a caller to more complex machines that ask a caller a sequence of questions separated by periods for caller responses. However, the equipment used should be adapted to deliver a prerecorded message to a caller and then transmit the caller's response to this message to one of the recorders 28a–b. Continuous loop message recorders such as those sold under the trade name "Thought Tank" by Dictaphone, or "Nyematic" by Lanier, may be suitably used for the recorders 28a–b. Circuits 27a–b extend between the concentrator 20, and recorders 28a–b, respectively, and transmit signals generated by the concentrator 20 which activate the recorders 28a–b directly. As explained below, conductors 27a–b are used by the concentrator 20 to activate the recorders 28a–b independently of the telephone answering machines 26a,b.

The recorders 28a–b are connected by circuits 32a–b to a distribution panel 34. Operator stations 36-b, which in this embodiment include a two position switch, are also connected to the distribution panel 34 via circuits 38a–b. The two position switch in operator stations 36a–b are manually operated, and permit each operator to select one of the two recorders 28a–b for the purpose of replaying caller responses stored therein. Distribution panels operate as junction boxes for electrical wiring and are well known in the art; consequently, no description of their construction will be made here.

The embodiment of FIG. 1 also includes a microprocessor 48 as an integral part of the system. This microprocessor 48 is provided with five types of input/output ports. The first set of ports includes four input ports which are connected to the concentrator 20 via the four conductors 50a–d, respectively. Each of these conductors is associated with one of the four telephone lines 10a–d. As will be explained in detail below, the concentrator 20 includes circuitry for generating a signal on one of the four conductors 50a–d whenever an incoming call is assigned to one of the two answering machines 26a–b. A signal on one of the conductors 50a–d informs the microprocessor that the system has initiated service on the telephone line associated with that conductor. As will be explained below, the microprocessor 48 is programmed to use this information to identify recorded caller responses and to record identification signals with the recorded caller responses associated with each individual call.

The second set of ports includes four input ports which are connected to the concentrator by the four conductors 52a–d. Once again, each of the conductors 52a–d is associated with one of the four telephone lines 10a–d. The concentrator 20 includes circuitry for transmitting a signal on one of the four conductors 52a–d when the telephone line associated with that conductor is disconnected. This circuitry will also be described below in connection with FIG. 2.

The third set of ports includes two input ports which are connected to tone recognition circuits 55a–b which are in turn connected by the conductors 54a–b to the circuits 38a–b, respectively. The circuits 38a–b carry the recorded caller responses as they are replayed at one of the operator stations 36a–b, and, therefore, the conductors 54a–b serve to carry to the tone recognition circuit 55a–b identification signals associated with each set of recorded caller responses as it is replayed by an operator. The tone recognition circuits 55a–b are tuned to provide the microprocessor with an input signal when an audio signal of a specified frequency and duration is present on the conductors 54a–b. The frequency and duration parameters of the tone recognition circuits 55a–b are chosen to correspond to the frequency and duration parameters of the single tone binary audio code used to record identification numbers. Such tone recognition circuits are well known in the art and will not be described in detail here. In some applications it may be advantageous to record caller responses and associated identification signals on separate channels of a multichannel recorder to facilitate recognition of the identification signals by the microprocessor.

The fourth set of ports includes two output ports which are connected to two display devices, 40a–b. Each display device 40a–b is associated with one of the two operating stations 36a–b and serves to display a digit between zero and four. Any suitable display device, such as a light emitting diode display, may be used.

Finally, the fifth type of port is an output port which is connected via conductor 58 to a single-tone audio signal generator 59 which may be of any suitable conventional design. The generator 59 operates to produce an audio signal on conductor 61 which serves as an input to the concentrator 20. When the microprocessor 48 generates a sequence of digital signals on conductor 58, a corresponding sequence of audio signals is presented on conductor 61. The tone frequency generated by the generator 59 is preferably in the range of 1,000 to 3,000 hz, and is chosen to match the frequency of the tone recognition circuits 55a–b.

Figure 2:
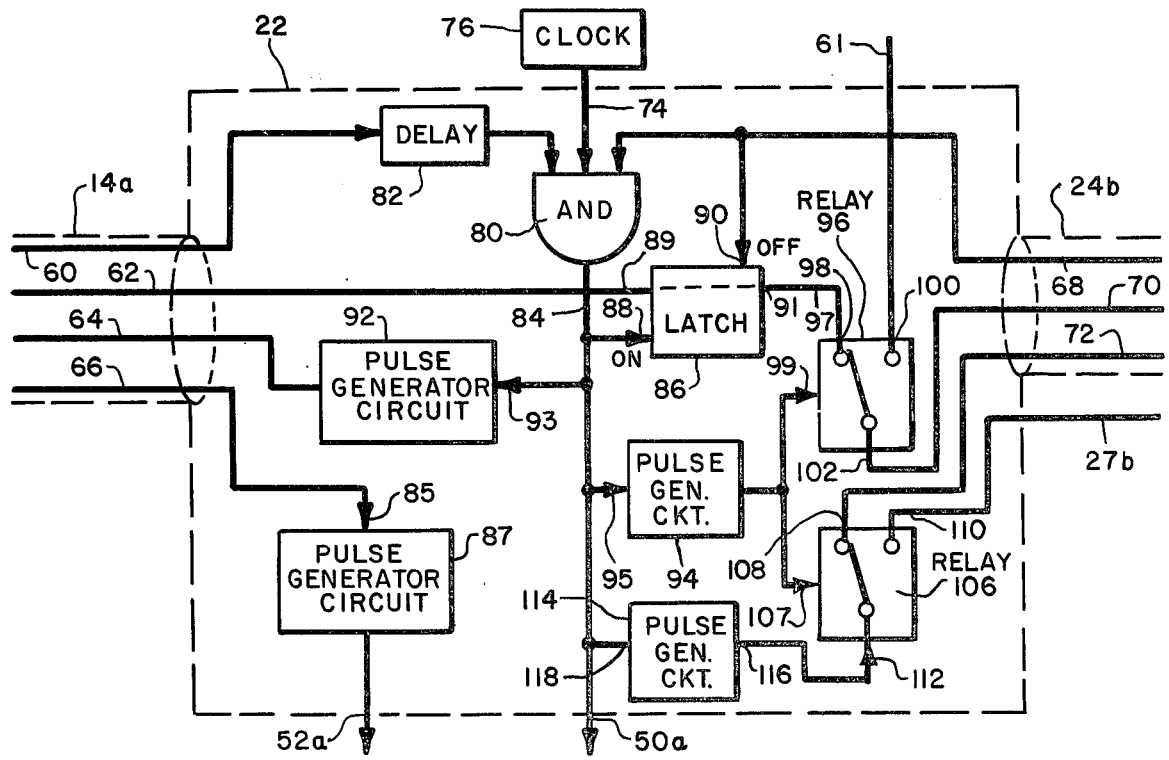
FIG. 2 is a detailed block diagram of one component of the call distributor of FIG. 1.

As mentioned previously, the concentrator 20 includes an array of intersection circuits 22. An intersection circuit 22, which is representative of all eight of the intersection circuits, is depicted in FIG. 2 in greater detail. The particular circuit 22 which is shown in FIG. 2 is the circuit which operates to interconnect the circuit 14a corresponding to the telephone line 10a with circuit 24b corresponding to the telephone answering system 26b.

As shown in FIG. 2, the circuit 14a actually includes four component circuits 60, 62, 64, 66. These circuits 60, 62, 64, 66 are described in detail in the Bell System Technical Reference Manual Publication No. PUB 42209 for the RDM-ZR, published by American Telephone and Telegraph Company, and will only be described functionally here. Circuit 60 is a service alerting line pair which closes when an incoming call on the associated telephone line 10a is ringing. Circuit 62 is an audio transmission line pair which carries audio signals. Circuit 64 is an answer pair which controls the RDM-ZR interface unit 12a to sieze the telephone line 10a on command. Circuit 66 is a status pair which opens when the calling party on telephone line 10a has disconnected.

Similarly, the circuit 24b which interconnects the concentrator 20 and the answering machine 26b actually includes three separate circuits 68, 70, 72. Circuit 68 carries a "ready" signal generated by the answering machine 26b when the machine is available to service an incoming call. Circuit 70 is an audio transmission line which carries audio signals to and from the concentrator 20 and the answering machine 26b. Finally, circuit 72 is a startup circuit which operates to cause the answering machine 26b to start operation and begin to service a call. The manner in which these circuits are used to control a telephone answering machine is well known in the art. Circuit 27b is a startup circuit which, when energized, causes the recorder 28b to begin to record.

The intersection circuit 22 of FIG. 2 is also connected to clocking circuitry 76 by a conductor 74. This clocking circuitry 76 actuates each of the eight intersection circuits 22 in a predetermined sequence to interconnect a ringing call with an available telephone answering machine. In this embodiment the clocking rate is approximately one quarter second. That is, the clock 76 generates a sequence of short duration pulses at the rate of about four a second and individual pulses are sequentially applied to the eight intersection circuits 22. This relatively slow clocking rate allows all operations associated with answering machine startup, including the recording of the audio identification signal, to be completed before the clock strobes another intersection circuit 22. Other connections between the intersection circuit 22 and the answering system of this embodiment include conductors 52a and 50a which provide inputs to the microprocessor.

AND gate 80 is provided with three inputs which are connected to the output of delay circuit 82, the clock input 74, and the machine available line 68, respectively. The AND gate 80 produces an output signal on line 84 only when all three input signals are simultaneously present. The delay circuit 82 receives the service alert circuit 60 as an input and produces an output signal only after the signal on the service alerting circuit continues according to an established pattern, usually two seconds closed, four seconds open for a predetermined period of time, and the service alerting circuit is activated. Typically, the delay period is in the range of six to sixty seconds to enable an operator to answer if available.

The output signal of the AND gate 80 appears on the conductor 84 and is applied to various components of the intersection circuit 22 in order to initiate service on the line 10a. The signal on conductor 84 is applied to the input terminal 93 of a pulse generating circuit 92 which causes the circuit 92 to deliver a pulse to circuit 64 which in turn causes the interface unit 12a to sieze and hold the telephone line 10a. The signal on conductor 84 is simultaneously applied to a microprocessor input conductor 50a, thereby signalling the microprocessor that service has been initiated on the telephone line 10a.

Other major components of the intersection circuit 22 include a latch circuit 86, two relays 96 and 106, and two pulse generating circuits 94 and 114. The latch circuit 86 is provided with control terminals 88 and 90 which are connected to the conductors 84 and 68, respectively, and signal terminals 89 and 91 which are connected to the audio transmission circuits 62 and 97, respectively. The signal on conductor 84 causes the latch circuit 86 to interconnect the audio transmission circuits 62 and 97. This interconnection is maintained until an input signal is received on terminal 90, indicating a change in availability status of machine available line 68.

The relays 96, 106 are similarly constructed with first, second, and third signal terminals, 98, 100, 102 and 108, 110, 112, and one control terminal, 99 and 107, respectively. When a signal is applied to the control terminal 99, 107 of either relay 96, 106, that relay interconnects the second and third signal terminals 100 and 102 or 110 and 112. In the absence of a signal on a control terminal 99 or 107, the corresponding relay 96 or 106 interconnects the first and third signal terminals 98 and 102 or 108 and 112. The two control terminals 99, 107 are connected to the output of a pulse generating circuit 94 whose input terminal 95 is connected to the output conductor 84. The pulse generating circuit 94 produces an output pulse of approximately one quarter second duration whenever an input signal is applied to terminal 95. This output pulse is shorter than the period of the clock pulse generated by the clock circuit 76.

As shown in FIG. 2, the three signal terminals 108, 110, 112 of the relay 106 are connected to conductors 72, 27b and the output 116 of pulse generating circuit 114, respectively. Thus, relay 106 operates to connect the output terminal 116 with the conductor 27b when a signal is applied to terminal 107 and to connect the output terminal 116 and the conductor 72 otherwise. Pulse generating circuit 116 has an input terminal 118 which is connected to conductor 84. A signal on conductor 84 causes circuit 116 to generate a pulse on output terminal 116 which is at least one tenth of a second longer than the pulse produced by circuit 94. Similarly, the three terminals 98, 100, and 102 are connected to circuits 97, 61, and 70, respectively, and relay 96 connects circuits 61 and 70 when a signal is applied to terminal 99 and circuits 97 and 70 otherwise. The intersection circuit 22 also includes a pulse generating circuit 87 having an input terminal 85 connected to circuit 66. This circuit 87 generates a pulse which is applied to the microprocessor 48 via conductor 52a whenever the circuit 66 indicates that the calling party has disconnected.

Having described the various elements and interconnections of this embodiment, the programming of the microprocessor and the operation of this embodiment can now be described. This description will be by way of the example of an incoming call on telephone line 10a which is answered by answering machine 26b and serviced by an operator at operator station 36a. However, it should be understood that this description applies equally to any other combination of telephone lines, answering machines and operators of the embodiment.

An incoming call on telephone line 10a which is ringing produces a signal on the service alerting circuit 60. Any operator who is available may answer the ringing call by manually intercepting the ringing line using standard telephone equipment, not shown. However, if for any reason the call goes unanswered for a time period greater than the delay interval of the delay circuit 82, then the call may be automatically answered by one of the answering machines 26a–b. The AND gate 80 functions to actuate an intersection circuit 22 when three independent conditions are met: (1) the associated telephone line has been ringing for more than a predetermined time period; (2) the associated answering machine is available; and (3) the circuit 22 is being strobed by the clock 76. In that the clock 76 strobes the intersection circuits one at a time, no more than one latching circuit 22 can meet all three conditions at any one time, and multiple latching is thereby avoided.

Once a signal appears on the output conductor 84 of the AND gate 80, indicating that the three above stated conditions have been met, the intersection circuit triggers the generation and recording of an identification signal, interconnects the incoming call with the available answering machine, and starts the appropriate answering machine. These functions are initiated by the simultaneous application of the signal on output conductor 84 of AND gate 80 to several components of the intersection circuit 22. This signal causes the pulse generator circuit 92 to signal the interface unit 12a via circuit 64 to sieze and hold the line 10a, and simultaneously causes the latch circuit 86 to interconnect the audio transmission circuit 62 and the circuit 97. Simultaneously, the signal on output conductor 84 causes the pulse generator circuits 94 and 114 to generate pulses at their respective output terminals. The pulse generated by circuit 94 is applied to the two relays 96 and 106. Throughout the duration of this pulse the recorder 28b is actuated by the pulse generated by circuit 114 which is transmitted by relay 106 to conductor 27b. Similarly, relay 96 connects the voice transmission line 70 of the answering machine 26b to the conductor 61 during the pulse generated by pulse generator circuit 94.

During this initial period following the siezing of the line 10a, the microprocessor generates and outputs an identification number which is associated with the call being answered. The microprocessor 44 receives via conductor 50a a pulse from the output conductor 84 of AND gate 80 when the intersection circuit 22 begins to service the incoming call. The microprocessor is programmed to respond to a signal on one of the four inputs 50a–d by generating an identification number associated with that signal. This identification number is stored as a binary number in the microprocessor memory and is also encoded on output conductor 58 as binary identification signal which includes characteristic beginning and end of block code sequences. This identification signal on conductor 58 is converted into a corresponding sequence of audio signals on conductor 61 by the audio generator 59.

In this embodiment the microprocessor is programmed to generate consecutive identification numbers and to store the identification numbers associated with each incoming line 50a–d in a separate memory location. Thus, the identification numbers stored in these memory locations correspond to the numbers generated for the last incoming call on each of the corresponding telephone lines 10a–d.

During the period immediately following the siezing of the telephone line 10a the relays 96, 106 cooperate to actuate the recorder 28b and to connect the conductor 61, which carries the audio coded identification number, to the audio transmission line 70. The audio coded identification code is thereby recorded on recorder 28b before the answering machine 26b is actuated. After the termination of the pulse generated by circuit 94, the relay 96 disconnects the transmission line 70 from the conductor 61 and connects it to the circuit 97 which has been previously connected with the transmission line 62. Similarly, the relay 106 disconnects conductor 27b and connects the startup circuit 72 to the output terminal 116 of the circuit 114, thereby causing the answering machine 26b to begin operation. At this point the recorder 28b is again under the control of the answering machine 26b, which is connected to the transmission circuit of telephone line 10a. This condition is maintained until the answering machine completes its cycle, at which time a signal will appear on the machine available line 68. This signal is applid to input terminal 90 of the latch circuit 86, and causes the latch circuit 86 to disconnect the transmission line 62 from the answering machine 26b. At this point the answering machine 26b is free to service another incoming call and the call on line 10a has effectively been placed on hold.

When the calling party disconnects a signal appears on circuit 66 which causes the pulse generator circuit 87 to generate a pulse which is transmitted via the conductor 52a to the microprocessor 48, which is programmed to set the memory location associated with the telephone line 10a to zero whenever a signal is sensed on conductor 52a. As previously explained, the microprocessor 48 assigns an identification number to each incoming call and stores this number in a memory location associated with the particular telephone line on which the call is located. This identification number is cleared and the memory location set equal to zero whenever the corresponding call is disconnected. In this way, the stored identification number is repeatedly updated so that at any point in time the stored list of identification numbers is representative of the callers on the separate telephone lines.

Summarizing, the concentrator operates both to interconnect incoming calls with available answering machines and to provide signals on lines 50a–d and 52a–d which are used by the microprocessor 48 to maintain a list of identification numbers associated with the calls on each of the incoming trunk lines 10a–d.

The answering machines 26a–b deliver prerecorded messages to the callers and transmit caller responses to these messages to recorders 28a–b for recording. The recorded responses are replayed by operators at the operator stations 36a–b. For instance, the operator at station 36a can manipulate a switch at that station to replay a set of recorded responses from recorder 28b over circuits 32b through distribution panel 34 to 38a. Conductor 54a transmits these recorded responses to the tone recognition circuit 55a at the same time as they are being transmitted to the operator. The microprocessor 4 is programmed to monitor the output of the tone recognition circuit 55a and to decode the identification numbers which are encoded as audio signals at the start of each set of recorded responses. The beginning and end of block code sequences facilitate recognition of the identification numbers. The decoded identification number is then compared by the microprocessor 48 with the identification numbers stored in memory. If one of the four stored identification numbers corresponds with the decoded number, then the caller whose responses are being replayed is still on one of the four incoming lines 10a–d. In this case, the microprocessor is programmed to generate output signals on the appropriate output conductor, 56a–b, which identify the line on which the caller is holding. This information is displayed on the corresponding display unit 40a–b. In this way, the operator is quickly informed as to whether or not the caller is waiting, and if so, on which line. The operator can then review the recorded responses and intercept the waiting call.

If the decoded identification number fails to correspond to one of the four identification numbers stored in microprocessor memory, then the caller has disconnected and is no longer waiting. The microprocessor is programmed to alert the operator to this situation by displaying a "zero" on the appropriate display device 40a–b. In this case the operator can either review the recorded responses to determine whether any follow-up action is required, or alternately advance to the next set of recorded responses.

By initially interrogating incoming calls the call distributor of this invention improves operator efficiency.

Operators can quickly review recorded caller responses in order to become familiar with the needs of the individual caller and then intercept the call to complete the servicing of the call.

The exemplary embodiment described above is adapted for use with four incoming telephone lines and includes two answering machines and two operator stations. Of course, it should be understood that various changes and modifications to this embodiment will be apparent to those skilled in the art. For instance, the invention can easily be adapted for use with various numbers of incoming telephone lines, answering machines, and operator stations. Various types of interface units may be used, and other types of identification signals may be readily devised. The use of a microprocessor is not central to the invention and the functions performed by the microprocessor may be hard wired in other embodiments. Furthermore, the invention may be embodied in a call distributor which automatically connects the operator to a waiting call when the identification signal corresponding to that call is replayed by an operator. Such changes and modifications can be made without departing from the spirit and scope of the present invention, and without diminishing its attendant advantages. It is, therefore, intended that such changes and modifications be covered by the following claims.

We claim:

1. A method for answering a call placed by a calling party on a telephone line comprising the steps of:
   automatically answering the call;
   automatically recording a voice message transmitted over the telephone line;
   automatically placing the calling party on hold after the message has been recorded;
   replaying the recorded voice message to an operator; and
   interconnecting the calling party and the operator to enable the operator to converse with the calling party after the recorded voice message has been replayed, whereby the operator is familiarized with the call prior to conversing with the calling party.

2. The method of claim 1 wherein the method further includes the step of automatically playing a prerecorded message to the calling party.

3. A telephone answering apparatus for answering calls on an incoming telephone line comprising:
   means for automatically answering a call placed by a calling party;
   means for automatically recording a voice message transmitted over the telephone line;
   means for automatically placing the calling party on hold after the voice message has been recorded;
   means for replaying the recorded voice message to an operator; and
   means for interconnecting the operator and the calling party after the recorded voice message has been replayed, whereby the operator is familiarized with the call prior to conversing with the calling party.

4. The apparatus of claim 3 further including means for automatically playing a prerecorded message to the calling party.

5. The apparatus of claim 3 further including means for indicating to the operator whether the calling party is on the telephone line after the recorded voice message has been replayed.

6. A telephone answering apparatus for answering calls on a plurality of telephone lines comprising:
   means for automatically answering a call on a first telephone line;
   means for automatically recording an audio message transmitted over the first line by a first calling party;
   means for placing the first calling party on hold after the audio message on the first line has been recorded;
   means for replaying the recorded audio message to an operator;
   means for determining whether the first calling party is on the first telephone line at a point in time following the initiation of the replay of the recorded audio message; and
   means responsive to the determining means for identifying the first telephone line to the operator in the event the first calling party is on the first telephone line at the point in time.

7. The apparatus of claim 6 wherein the identifying means includes display means adapted to identify the first telephone line to the operator.

8. A telephone answering apparatus for answering calls on a telephone line comprising:
   means for automatically answering the telephone line;
   means for automatically recording a voice message transmitted over the telephone line by a calling party;
   means for automatically placing the calling party on hold after the voice message has been recorded;
   means for automatically generating an identification signal;
   means for automatically recording the identification signal in association with the recorded voice message;
   means for automatically storing the identification signal;
   means for automatically altering the identification signal stored in the storing means following disconnection of the telephone line;
   means for replaying the recorded voice message and the associated identification signal;
   means for automatically receiving the associated identification signal from the replaying means and comparing the associated identification signal with the stored identification signal;
   means responsive to the receiving means for automatically indicating whether the associated identification signal is stored in the storing means following the initiation of replay of the associated identification signal, whereby an operator is informed whether the calling party associated with the recorded voice message is on the telephone line at that time; and
   means for interconnecting the operator with the calling party after the recorded voice message has been replayed.

9. The apparatus of claim 8 wherein the identification signal is recorded in association with the recorded voice message as a sequence of audio tones.

* * * * *

UNITED STATES PATENT AND TRADEMARK OFFICE
CERTIFICATE OF CORRECTION

PATENT NO. : 4,150,255
DATED : April 17, 1979
INVENTOR(S) : Peter F. Theis

It is certified that error appears in the above-identified patent and that said Letters Patent are hereby corrected as shown below:

Column 3, line 25, delete "26a,b" and insert --26a-b-- therefor.

Column 3, line 39, delete the "-" after input.

Column 7, line 6, delete "sieze" and insert --seize-- therefor.

Column 7, line 19, delete "siezing" and insert --seizing-- therefor.

Column 7, line 45, delete "siezing" and insert --seizing-- therefor.

Signed and Sealed this

Twenty-third Day of October 1979

[SEAL]

Attest:

RUTH C. MASON
Attesting Officer

LUTRELLE F. PARKER
Acting Commissioner of Patents and Trademarks